(12) United States Patent
Boyer et al.

(10) Patent No.: US 12,181,286 B2
(45) Date of Patent: Dec. 31, 2024

(54) METHOD FOR DETERMINING A TRAJECTORY OF AN AIRCRAFT, ASSOCIATED COMPUTER PROGRAM PRODUCT AND DETERMINATION MODULE

(71) Applicant: THALES, Courbevoie (FR)

(72) Inventors: Johan Boyer, Toulouse (FR);
Emmanuel Dewas, Toulouse (FR);
Geoffrey Durand, Toulouse (FR)

(73) Assignee: THALES, Courbevoie (FR)

( * ) Notice: Subject to any disclaimer, the term of this patent is extended or adjusted under 35 U.S.C. 154(b) by 353 days.

(21) Appl. No.: 17/637,299

(22) PCT Filed: Aug. 20, 2020

(86) PCT No.: PCT/EP2020/073317
§ 371 (c)(1),
(2) Date: Feb. 22, 2022

(87) PCT Pub. No.: WO2021/032830
PCT Pub. Date: Feb. 25, 2021

(65) Prior Publication Data
US 2022/0282975 A1 Sep. 8, 2022

(30) Foreign Application Priority Data
Aug. 22, 2019 (FR) ...................................... 1909339

(51) Int. Cl.
*G06F 17/00* (2019.01)
*G01C 21/00* (2006.01)
*G01C 21/20* (2006.01)

(52) U.S. Cl.
CPC ........... *G01C 21/20* (2013.01); *G01C 21/005* (2013.01)

(58) Field of Classification Search
CPC .... G01C 21/20; G01C 21/005; G08G 5/0039; G08G 5/0052
(Continued)

(56) References Cited

U.S. PATENT DOCUMENTS 6,163,744 A 12/2000 Onken et al.
9,142,135 B2 * 9/2015 Le Gall ................... B64C 19/00
(Continued)

FOREIGN PATENT DOCUMENTS

FR 3 019 284 A1 10/2015

OTHER PUBLICATIONS

Torres, Evaluation of numerical Methods for Aircraft Trajectory Computation, IEEE Xplore, (Year: 2018).*
(Continued)

*Primary Examiner* — Matthew Ell
*Assistant Examiner* — Matthew J Ludwig
(74) *Attorney, Agent, or Firm* — ArentFox Schiff LLP

(57) ABSTRACT

This method comprises a step of determining a reference profile along a lateral trajectory precalculated comprising searching, in the precalculated lateral trajectory, at least one segment of discontinuity comprising a lateral discontinuity, determining a required distance corresponding to a minimum flight distance between the two segments bordering the discontinuity segment and integrating each required distance into the reference profile.

This method further comprises a step of determining, on the basis of the reference profile, vertical predictions relating to a vertical trajectory of the aircraft and a step of determining, on the basis of the vertical predictions, a resulting lateral trajectory comprising, for each discontinuity segment, determining a substitution segment connecting the two corresponding bordering segments in a continuous manner.

12 Claims, 11 Drawing Sheets

(58) Field of Classification Search
USPC .......................................................... 701/528
See application file for complete search history.

(56) References Cited

U.S. PATENT DOCUMENTS

| | | | |
|---|---|---|---|
| 11,016,988 B1* | 5/2021 | Watson | G01C 23/00 |
| 2011/0077858 A1* | 3/2011 | Coulmeau | G08G 5/0039 |
| | | | 701/465 |
| 2012/0191333 A1* | 7/2012 | Sawhill | G08G 5/0052 |
| | | | 701/122 |
| 2014/0032095 A1* | 1/2014 | Courteville | G05D 1/101 |
| | | | 701/400 |
| 2017/0061804 A1* | 3/2017 | Navarro Felix | G05D 1/0088 |
| 2019/0033861 A1* | 1/2019 | Groden | G05D 1/106 |

OTHER PUBLICATIONS

International Search Report, issued by International Searching Authority in corresponding International Application No. PCT/EP2020/073317, mailed on Oct. 30, 2020.

* cited by examiner

METHOD FOR DETERMINING A TRAJECTORY OF AN AIRCRAFT, ASSOCIATED COMPUTER PROGRAM PRODUCT AND DETERMINATION MODULE

CROSS-REFERENCE TO RELATED APPLICATIONS

This application is a National Stage Entry of International Patent Application No. PCT/EP2020/073317, filed on Aug. 20, 2020, which claims priority to French Application No. 19 09339, filed on Aug. 22, 2019. The disclosures of the priority applications are incorporated in their entirety herein by reference.

This invention concerns a method for determining a trajectory of an aircraft.

This invention also concerns a computer program product and determination module.

In particular, the invention is situated in the field of flight management systems (FMS) for aircraft, and, more generally, systems for calculating the trajectories of aircraft.

As is known from the prior art, these systems allow for the construction of an aircraft trajectory based on a flight plan representing the contract between the airline company and air traffic control. The trajectory based on this flight plan thus complies with a plurality of:
waypoints;
procedural constraints 'legs', consisting of a 'path/end' pair;
transitional constraints (e.g. 'overfly' or 'flyby');
'vertical' constraints carried by the waypoints, which may relate to altitude, speed, slope, or time.

The trajectory calculated consists of a plurality of successive lateral 'curve' or 'line' segments and vertical segments, which may include acceleration/deceleration, constant speed, constant altitude, or variable altitude. The lateral and vertical segments are connected; thus, the vertical may segment the lateral, and vice versa.

The various types of legs, as well as the rules for their sequencing are set forth, inter alia, by the standard ARINC 424.

Most of these legs define a starting point and an endpoint. Furthermore, vertical constraints may be defined on one or both of these points.

At least some of the legs may have no specified endpoints. In ARINC 424, this is the case, in particular, with the FM leg (Fix to a Manual termination) and the VM leg (Heading to a Manual termination). These legs are 'manual' or 'manual termination' legs, given that the end of such a leg is determined manually by the pilot while flying over the leg, e.g. following an instruction from air traffic control. The system inserts a lateral discontinuity following these legs, indicating that the remainder of the flight plan will only be followed after action by the pilot.

When the aircraft's flight plan includes a manual termination leg or another lateral discontinuity, the trajectory on which the aircraft must fly is not entirely known.

In the prior art, the solution generally used to address this issue is to assume a direct distance, i.e. the shortest distance to reach the next part of the flight plan, in calculating predictions.

This is shown in FIG. 1, in which a lateral discontinuity is formed between the segments DC and AB. Thus, in this case, in known-art methods, the shortest distance between these segments, i.e. the distance BC, will be taken into account when calculating predictions.

The use of such an assumption in current systems has several operational consequences.

First of all, it results in predictions that are erroneous in terms of the distance flown, which may, in turn, cause untimely alerts. Indeed, an altitude or speed constraint may fail to be announced downstream of the lateral discontinuity because the distance is too short for the necessary energy dissipation. This may generate an unfounded alert from the preparation of the flight, thus making this operation more complex.

Additionally, given the need to comply with the flight plan, this may make it necessary to begin losing energy for a landing much earlier than necessary. Indeed, an FMS system, calculating that the aircraft will not be able to decelerate along the lateral discontinuity if it is too steep, will begin deceleration before the aircraft arrives at the lateral discontinuity.

This operation runs counter to expectations given that, generally, the instructions given by controllers concerning the deselection of the manual termination leg allow for the necessary energy dissipation along this leg.

Moreover, this operation may result in premature extension of certain actuators such as slats and flaps. Because the calculation of altitude profiles is intimately linked to the calculation of speed profiles, this may also result in altitude being stepped down during the construction of the aircraft's trajectory, which is not desirable in the context of flight optimisation.

Lastly, when automatic guidance is used, a lateral discontinuity that results in an overly steep segment may result in vertical guidance in the form of a 'dive' in order to better follow the pronounced slope of this profile. This translates into a more or less substantial increase in speed. When descending, and, more specifically, when approaching, it is not desirable for an aircraft to accelerate.

The objective of this invention is to propose a manner of calculating the trajectory of an aircraft in the presence of lateral discontinuities that is more coherent in terms of predictions and the energy dissipation actually experienced by the aircraft. This addresses the aforementioned disadvantages of the prior art and, in particular, to avoid unfounded alerts, premature extension of actuators, and over-steep descents.

To this end, the invention relates to a method for determining a trajectory of an aircraft, comprising the following steps:
determining a reference profile along a lateral trajectory precalculated based on a plurality of speed and/or altitude constraints, the precalculated lateral trajectory comprising a plurality of segments, the determining step comprising:
searching in the precomputed lateral trajectory for at least one segment of discontinuity between two segments called frame segments, the segment of discontinuity comprising a lateral discontinuity;
for the or each segment of discontinuity, determining a required distance corresponding to a minimum flight distance between the two corresponding frame segments, allowing for compliance with all speed and/or altitude constraints whilst flying along these frame segments; and
integrating the or each required distance into the reference profile;
determining, based on the reference profile, vertical predictions related to a vertical trajectory of the aircraft;
determining, based on the vertical projections, a resulting lateral trajectory based on the vertical projections, comprising, for the or each segment of discontinuity, determining a substitution segment connecting the two corresponding frame segments in a continuous manner, the spatial extent of the or each substitution segment being determined as a function of the required distance determined for the corresponding segment of discontinuity.

According to other advantageous aspects of the invention, the method comprises one or more of the following characteristics, alone or in any combination technically possible:

the or each required distance is greater than or equal to the direct distance connecting the corresponding frame segments;

the step of determining the reference profile comprises the following sub-steps, which are carried out in reverse from each new integration starting point;

determining an intermediate endpoint and determining a geometric portion of the reference profile delimited by the integration starting point and the intermediate endpoint;

searching, on the geometric portion, a segment of discontinuity between two segments, the two segments being then frame segments;

when such a segment of discontinuity exists:

determining the required distance for the segment of discontinuity;

integrating the required distance into the portion of the reference profile;

the or each required distance (dreq) is determined as a function of the direct distance (ddir) between the frame segments of the corresponding segment of discontinuity.

the or each required distance is further determined as a function of a plurality of elementary slopes, each elementary slope being calculated for an elementary interval that is part of the geometric portion on which the segment of discontinuity corresponding to this required distance has been identified, as a function of the performance of the aircraft on this elementary interval;

the or each required distance is further determined as a function of a slope retained for the geometric portion on which the segment of discontinuity corresponding to this required distance has been identified, the retained slope corresponding to one of the elements selected from the group including:

a resulting equivalent slope determined using the value of the distance required and the altitude variation over said geometric portion;

a slope having a smallest absolute value amongst a plurality of elementary slopes, each elementary slope being calculated for an elementary interval that is part of the geometric portion as a function of the performance of the aircraft over the elementary interval;

the or each required distance is further determined as a function of the variation in altitude over the geometric portion on which the segment of discontinuity corresponding to this required distance has been identified and of a retained slope, said retained slope being selected from a plurality of elementary slopes, each following elementary slope being obtained by means of an iterative dichotomy technique using an initial elementary slope and a preceding elementary slope;

the or each segment of discontinuity corresponds to a manual termination leg;

the determination of the substitution segment for the or each segment of discontinuity in the step of determining the resulting lateral trajectory comprises determining a deselection point of the corresponding manual termination as a function of the required distance determined for this discontinuity segment and of the direct distance between the corresponding frame segments;

a symbol representing the deselection point for the or each manual termination leg is shown on a screen representing the resultant lateral trajectory of the aircraft;

the substitution segment for the or each segment of discontinuity is shown on a screen representing the resultant lateral trajectory of the aircraft;

The invention also concerns a computer program product including software instructions that, when executed by computer equipment, execute the method as defined supra.

The invention also concerns a module for determining a trajectory of an aircraft, comprising technical means configured to carry out the method as defined supra.

These features and advantages of the invention will become apparent upon a reading of the following description, given by way of example only and without limitation, by reference to the drawings appended hereto, in which.

'Aircraft' refers to any machine that can be controlled to fly, in particular in the terrestrial atmosphere, e.g. an aeroplane, in particular a commercial airliner, a helicopter, a drone, etc.

The aircraft can be controlled by a pilot from a cockpit of the aircraft or remotely.

In particular, the aircraft includes an FMS (flight management system), which allows for the construction of a trajectory of the aircraft based on a flight plan input into the system by the pilot. To this end, the FMS is provided with a user interface that allows the pilot to input the necessary information into the system and to obtain a visual representation of the calculations carried out by the system, e.g. the trajectory of the aircraft.

To this end, the user interface of the FMS is, for example, in the form of a suitable keyboard and one or more suitable displays.

Figure 1:
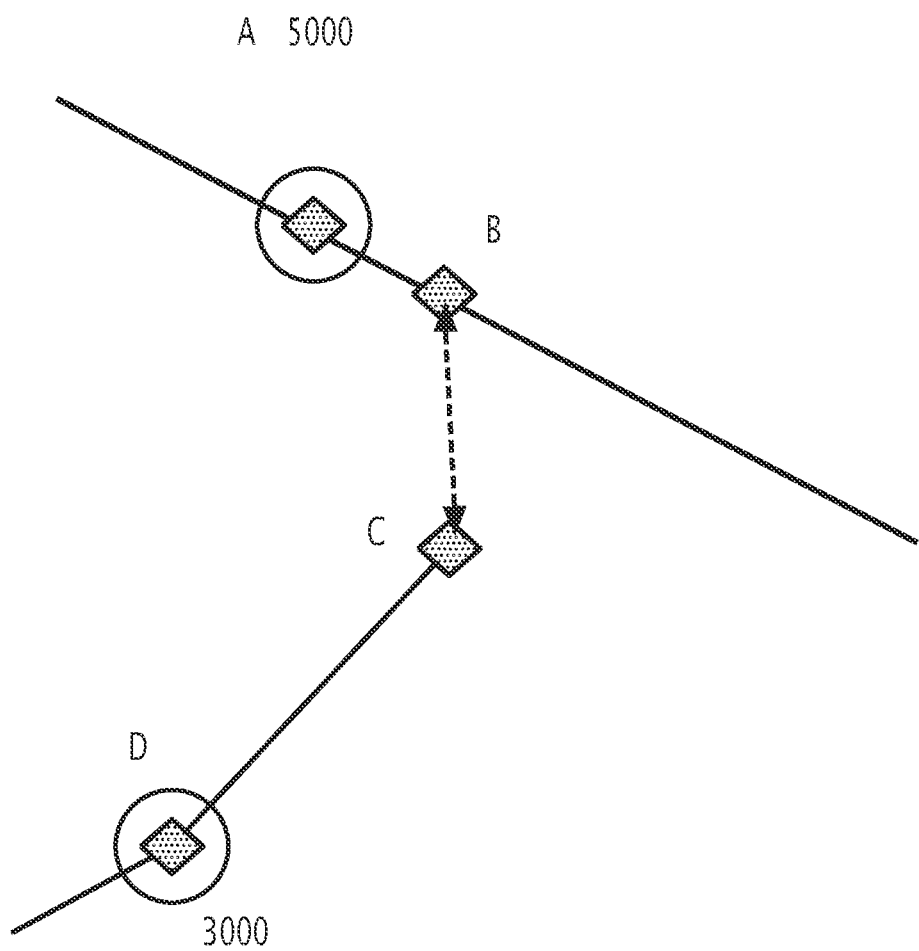
FIG. 1 is a schematic view of the calculation of predictions according to known-art methods.
Figure 2:
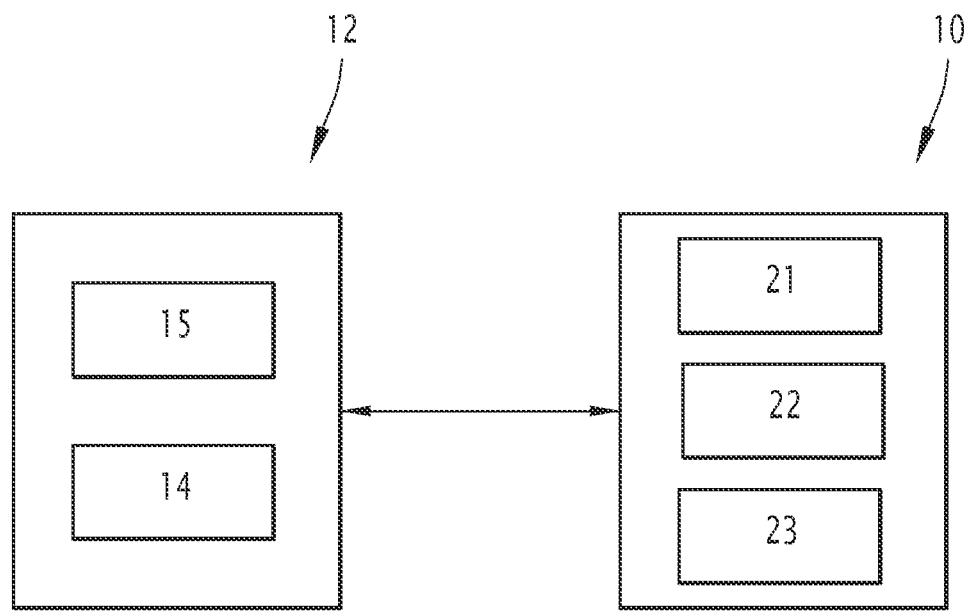
FIG. 2 is a schematic view of a module for determining a trajectory of an aircraft according to the invention.

In the exemplary embodiment of FIG. 2, the determination module 10 is connected to the FMS, which, in FIG. 2, is indicated by reference numeral 12.

The determination module 10 is on board the aircraft or remote from it. In the latter case, this module 10 is connected to the FMS via known-art means for the remote transmission of digital data.

Additionally, the module 10 is suited to receive data input by the pilot into the FMS 12 via the keyboard 14 of the FMS 12 and to display the results of its operation on the screen 15 of the FMS 12 or on any other screen in the cockpit of the aircraft or on a remote screen.

Additionally, in a particular exemplary embodiment of the invention (not shown), the module 10 is suited to receive data from a datalink with the ground.

In the exemplary embodiment of FIG. 2, the module 10 is in the form of a computer including an input unit 21, a processing unit 22, and an output unit 23.

Each of the units 21, 22, 23 is, e.g., at least partially in the form of software run by the computer that forms the module 10, in particular using a processor and a memory provided for this purpose in the computer.

In another exemplary embodiment (not shown), the module 10 is incorporated into the FMS 12 or in any other computer of the aircraft, or a remote computer. In this case, the units 21, 22, 23 are at least partially in the form of software that can be run by such a computer.

The input unit 21 is suited to receive data from the FMS 12 and to transmit them to the processing unit 22.

The processing unit 22 is suited to process these data, as well be explained infra, and to transmit a result of the processing to the output unit 23.

Finally, the output unit 23 is suited to transmit this result to the FMS 12, e.g. in order to display it on the screen 15 or on any other screen in the cockpit.

Figure 3:
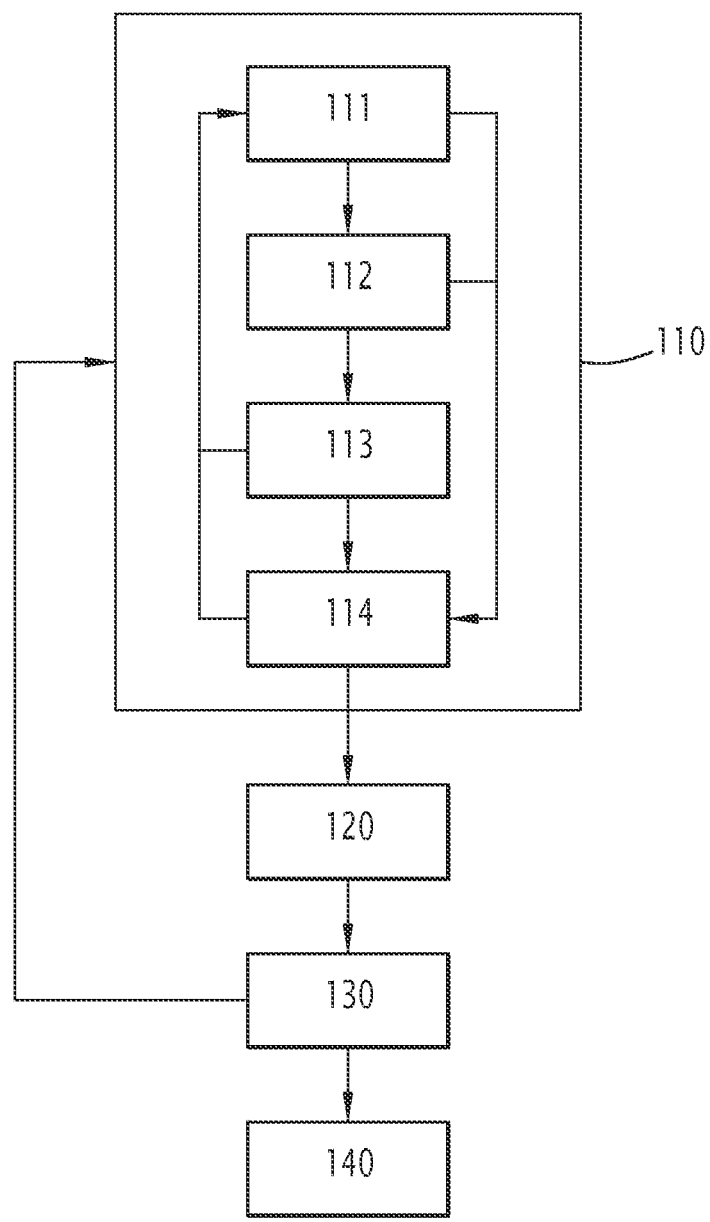
FIG. 3 is a flowchart of a determination method according to the invention, with the method being carried out by the determination module of FIG. 2.

The method for determining the trajectory of the aircraft carried out by the module 10 will now be explained by reference to FIG. 3, which shows a flowchart of its steps. In particular, the trajectory calculated by this method comprises a reference profile that will serve as a reference for the aircraft in order to carry out its descent and approach.

Advantageously, the method is carried out during preparation for the flight by the pilots.

In this case, the pilots have a lateral trajectory precalculated based on a plurality of speed and/or altitude constraints from a flight plan.

Each constraint of the flight plan is associated with a waypoint of the trajectory of the aircraft on which it imposes at least one flight parameter for the aircraft. Such a constraint refers, in particular, to an altitude or speed constraint, respectively defining at least one speed or altitude value that must be complied with.

Moreover, as is known, each constraint includes a type of constraint indicating how the value(s) defined by the constraint must be complied with.

In particular, in the prior art, the following types of constraint are known:
- 'AT', defining a single value that means that the corresponding flight parameter must be equal to this value;
- 'AT OR ABOVE', defining a single value that means that the corresponding flight parameter must be greater than or equal to this value;
- 'AT OR BELOW, defining a single value that means that the corresponding flight parameter must be less than or equal to this value;
- 'WINDOW', defining two values that mean that the corresponding flight parameter must be included within a range delimited by these two values.

In another exemplary embodiment of the invention, the method is carried out whilst the aircraft is in flight based on an existing reference profile. This is done, in particular, when the reference profile must be modified, e.g. after a new constraint or instruction has been received. In this case, the precalculated trajectory is the existing reference profile.

Lastly, prior to the execution of the method, the input unit 21 receives all of the necessary data, in particular the precalculated trajectory, in order to determine a reference profile to be followed by the aircraft.

Then, the input unit 21 transmits all of the data received to the processing unit 22.

In the initial step 110, the processing unit 22 determines a reference profile to be followed by the aircraft based on a precalculated trajectory. In other words, either a new reference profile is determined or an existing reference profile is updated.

As is known, this determination is carried out by means of a back calculation consisting of various operations:
- calculation of the final approach;
- calculation of the intermediate approach;
- calculation of the geometric descent;
- calculation of the optimised descent.

The calculation of the reference profile is carried out by the sub-steps 111 to 114, which are repeated in a loop starting from the beginning of the integration until the altitude and speed at the end of cruising are reached, or until the current position of the aircraft is reached. When the sub-steps 111 to 114 are first carried out, the starting point of the integration corresponds to the destination of the aircraft, given that the calculation is carried out in reverse.

In particular, in the sub-step 111, the processing unit 22 determines an intermediate endpoint allowing the reference profile being constructed to be delimited from the starting point of the integration for one iteration of the sub-steps 111 to 114.

According to the invention, this intermediate endpoint corresponds to the next altitude constraint that requires a change in slope, whilst allowing for compliance with all of the intermediate constraints on the geometric portion in question.

A constraint requiring a change in slope is generally referred to as a binding constraint.

In one exemplary embodiment, to this end, the processing unit 22 first carries out a back calculation of the geometric portion in question from the integration starting point to the next AT constraint, if any.

If the geometric portion thus formed complies with all of the intermediate constraints, the AT constraint will be the intermediate endpoint sought, and the processing unit 22 goes on to the next sub-step 112.

Figure 4:
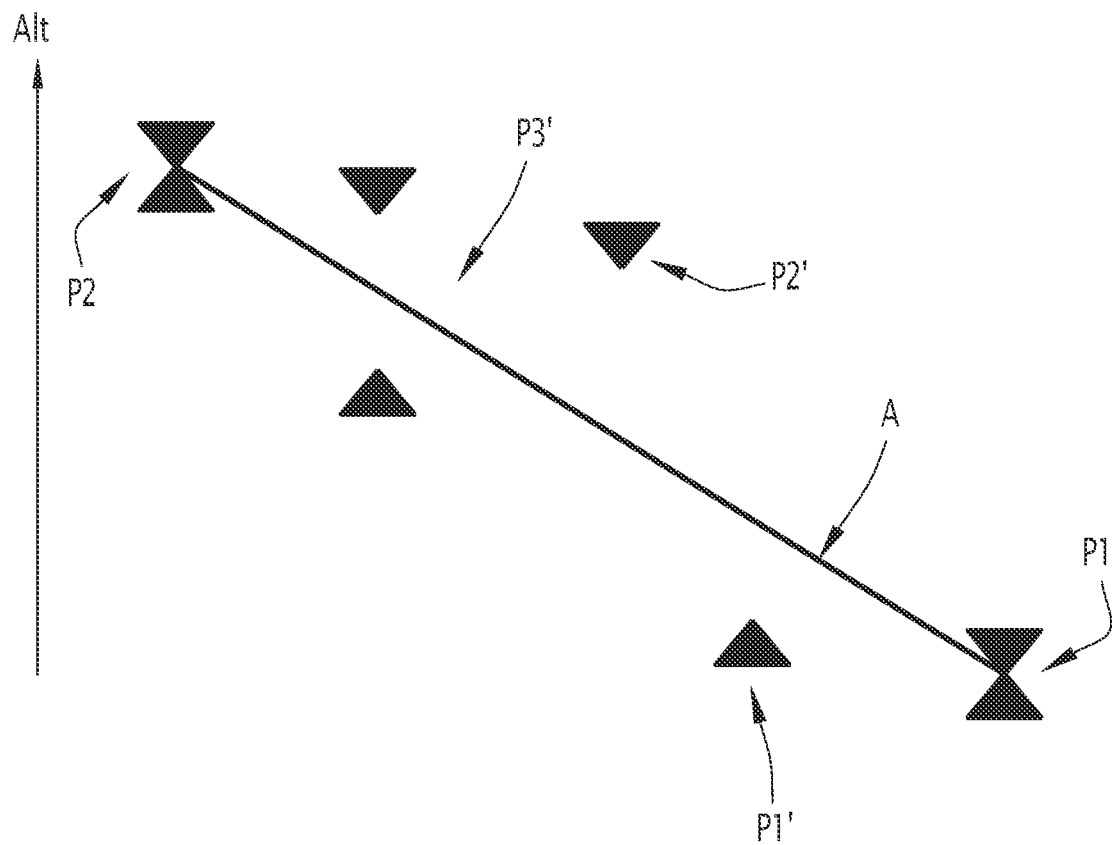
FIGS. 4-11 are views of the execution of various steps of the method of FIG. 3.

Such a case is shown in FIG. 4, in which the integration starting point is indicated by 'P1' and the AT altitude constraint by 'P2'. Thus, it is clear that, in the case shown, the altitude profile A constructed between the points P1 and P2 complies with all of the intermediate constraints, i.e. the constraints P1', P2', and P3'.

Otherwise, i.e. if the geometric portion constructed between the integration starting point and the AT constraint does not comply with at least one intermediate constraint, the sub-step 111 is restarted, as in the previous case, at the integration starting point, but its target this time is the intermediate constraint that was missed. This constraint is then a type other than AT. The geometric portion in question in this new iteration of the sub-step 111 is then delimited by the integration starting point and the constraint missed in the previous calculation.

The sub-step 111 is thus repeated until the slope of the geometric portion obtained allows for compliance with all of the intermediate constraints included between the integration starting point and the target constraint, which will then be considered the intermediate endpoint sought.

Figure 5:
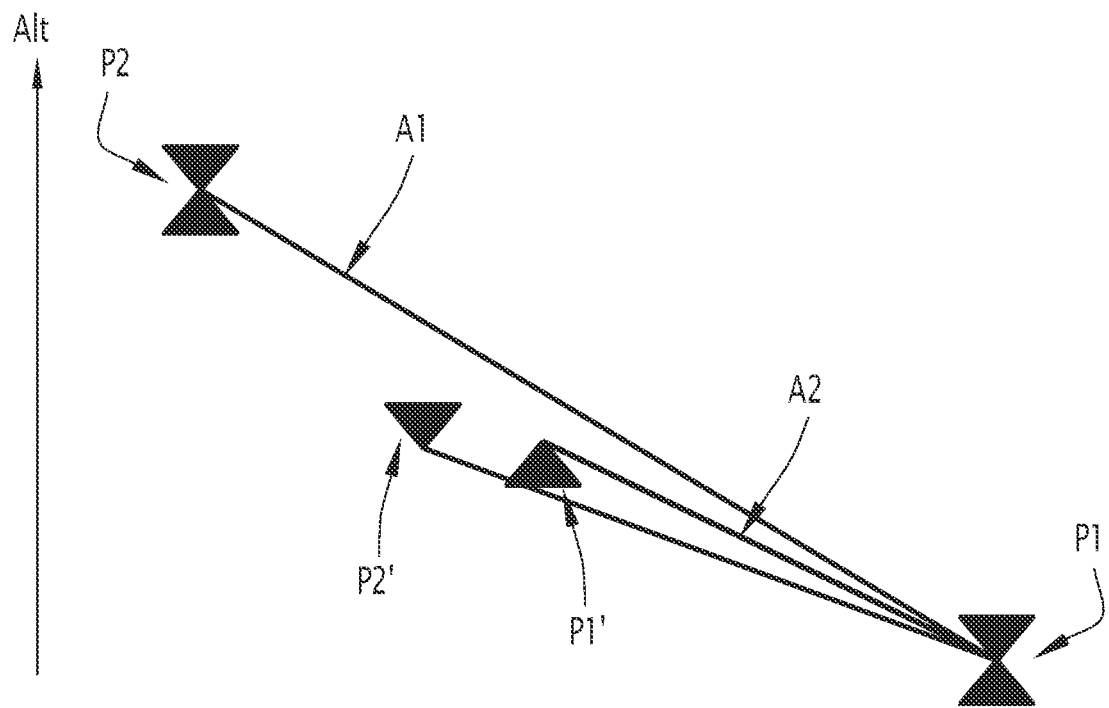

Such a case is shown in FIG. 5, in which the altitude profile A1 constructed between the integration starting point P1 and the next (AT) constraint P2 does not comply with the intermediate constraint P2'. The sub-step 111 is then repeated until the altitude profile A2 is obtained between the points P1 and P1', which complies with all intermediate constraints.

If there is no binding constraint, the profile is calculated with a group of segments having a constant thrust up to the cruising level, the calculation considered optimal in terms of fuel consumption, and referred to as the 'idle' profile.

If this group of segments allows for compliance with all altitude constraints, there is no altitude constraint requiring a change in slope. In this case, the processing unit 22 searches for a speed constraint with a low limit (i.e. AT OR ABOVE, AT, or WINDOW) that would be missed. If such a speed constraint is found, it is considered the intermediate endpoint that is sought. Otherwise, the processing unit 22 moves directly to the step 130, which is explained in detail infra.

Figure 6:
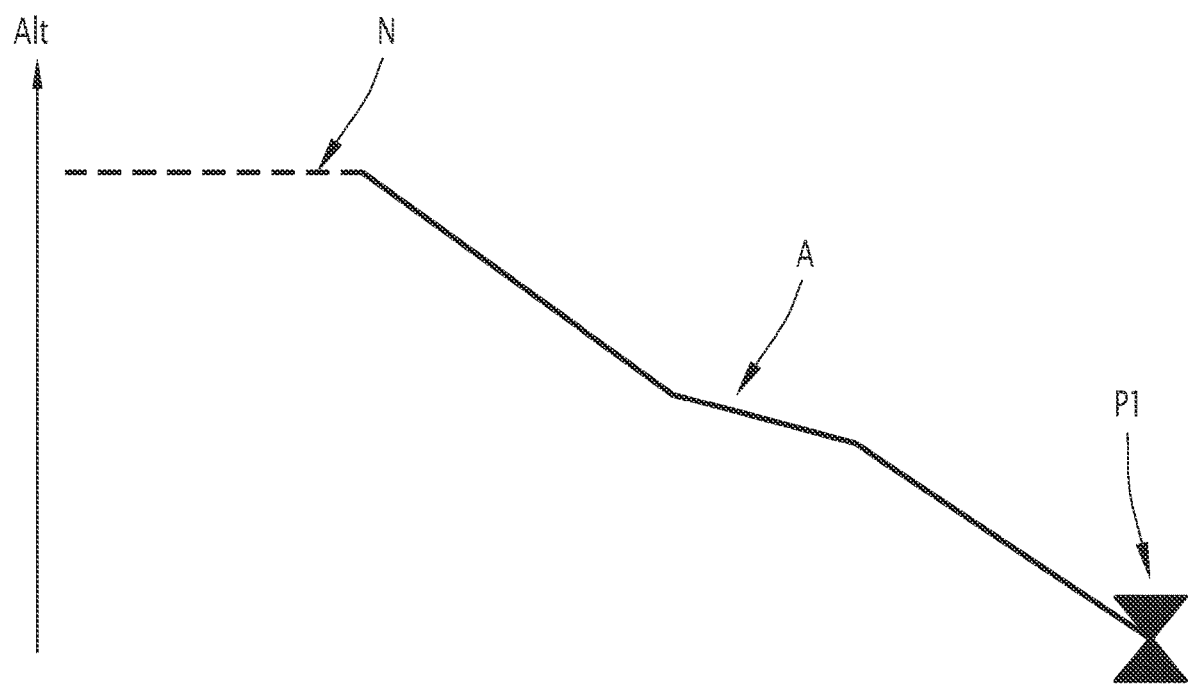

This case is shown in FIG. 6, in which the altitude profile A constructed between the integration starting point P1 and the cruising level N satisfies all intermediate constraints between these points.

If the group of segments having a constant thrust does not allow for compliance with at least one intermediate altitude constraint, the sub-step 111 is restarted at the integration starting point, and its target this time is the constraint that was missed, which will then be a constraint other than an AT constraint. The step 111 is then repeated until the slope of the geometric portion obtained allows for compliance with all intermediate constraints between the integration starting point and the target constraint.

Figure 7:
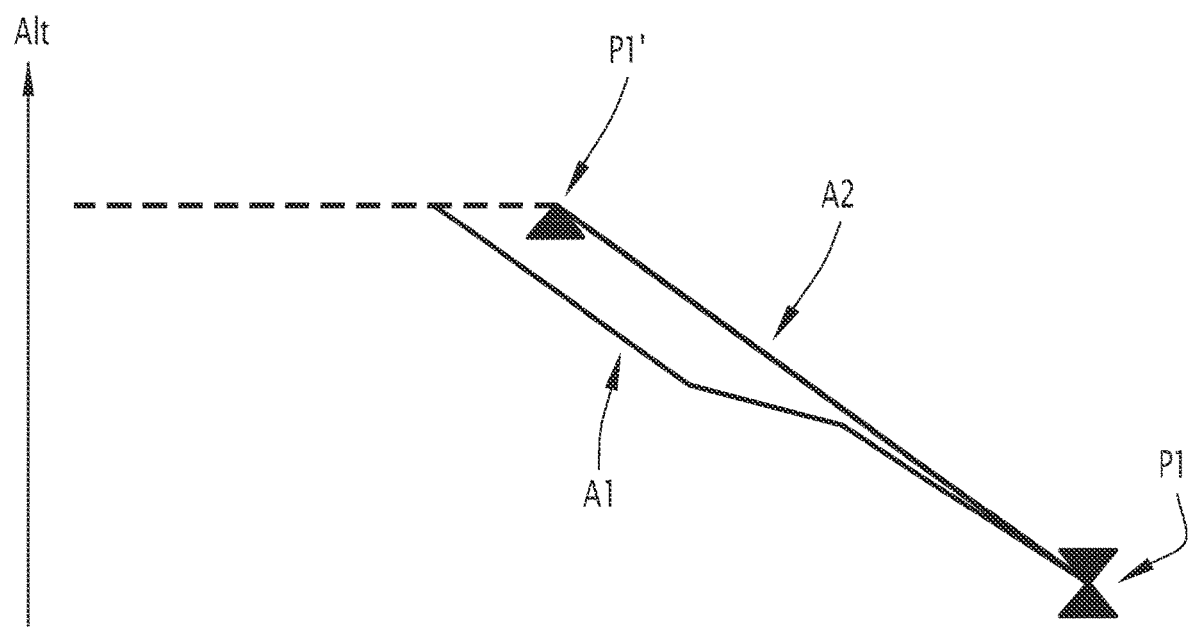

This case is shown in FIG. 7, in which the altitude profile A1 constructed between the integration starting point P1 and the cruising level point N does not allow for compliance with the intermediate altitude constraint P1'. The step 111 is then repeated, targeting the point P1' and thus obtaining the profile A2. To the extent that this profile A2 allows for compliance with all intermediate points, the point P1' is considered the intermediate endpoint sought.

In the following sub-step 112, the processing unit 22 searches the geometric portion delimited by the integration starting point and the intermediate endpoint determined in the sub-step 111 for a segment ('segment of discontinuity') comprising a lateral discontinuity. This lateral discontinuity may, for example, be a manual termination leg.

The segment of discontinuity is between two segments ('frame segments').

If there is at least one segment of discontinuity in the geometric portion, the processing unit 22 will go to the following sub-step 113. Otherwise, the processing unit 22 moves directly to the sub-step 114, which is described in detail infra.

Figure 8:
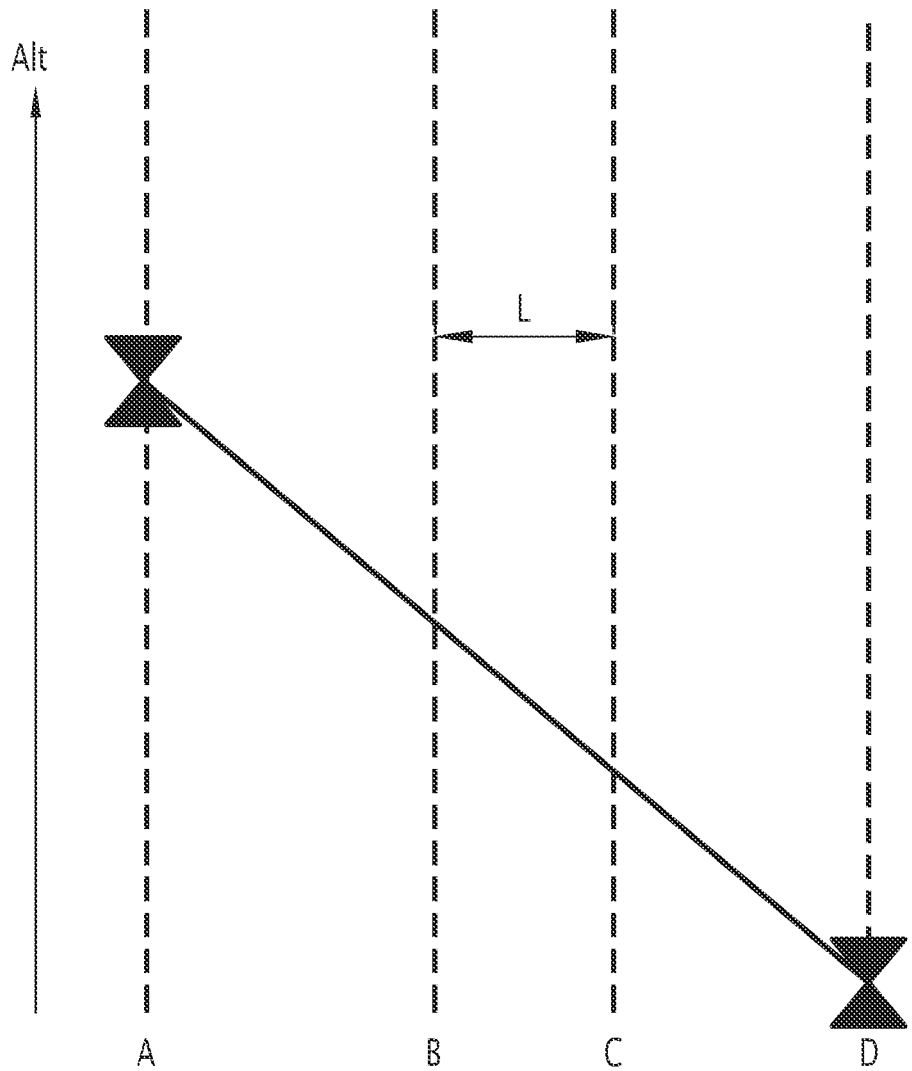

In the example of FIG. 8, a manual termination leg L is determined between the points B and C. The segment BC is then a discontinuity segment. Additionally, in this example, the point D corresponds to the integration starting point, and the point A corresponds to the intermediate endpoint determined at the end of the sub-step 111.

In the sub-step 113, for the segment of discontinuity identified, the processing unit 22 determines a required distance $d_{req}$ corresponding to a minimum flight distance over the segment of discontinuity to ensure sufficient energy dissipation for compliance with upstream, intermediate, and downstream constraints, i.e. at the waypoints A, B, C, and D in the examples illustrated.

The energy dissipation depends on whether the configuration of the aircraft allows for the energy to be dissipated. This configuration is defined, in particular, by the position of the air brakes of the aircraft, its slats and flaps, or its landing gear.

Advantageously, according to the invention, the required distance $d_{req}$ is determined as a function of the direct distance $d_{dir}$ between the corresponding frame segments and the total extent of the geometric portion in question.

In a first embodiment, the required distance $d_{req}$ is determined according to the following expression:

$$d_{req} = d_{dir} + \max\left(0, \sum_i \frac{\Delta H_i}{\tan(FPA_i)} - x\right) \quad (1)$$

where $d_{dir}$ is the direct distance between the corresponding frame segments, i.e. the distance BC in the example of FIG. 8;

x is the total extent of the geometric portion in question, i.e. the distance AD in the example of FIG. 8, assuming that the extent of the segment of discontinuity is substituted by the direct distance ($d_{dir}$) between the frame segments;

$FPA_i$ is an elementary slope on an elementary interval i obtained following the altitude discretisation of the altitude variation interval corresponding to the geometric portion in question and determined relative to the ground; and $\Delta H_i$ is the step defining the elementary interval i.

In particular, the altitude variation interval corresponding to the geometric portion in question is discretised as follows:

$$h_{i+1} = h_i + \Delta H_i,$$

where:

$h_i$ and $h_{i+1}$ are the altitudes delimiting the elementary interval i; and $$\Delta H_i = \min\left(h_{CSTR\,x} - h_i, \frac{(CAS_p - CAS_i)}{\frac{dCAS}{dh}_{TGT}}, \Delta H_{MAX}, h_f - h_i\right).$$

Thus, the expression for the altitude hi+1 takes the following form:

$$h_{i+1} = \min\left(h_i + \min\left(\frac{(CAS_p - CAS_i)}{\frac{dCAS}{dh}_{TGT}}, \Delta H_{MAX}\right), h_{CSTR\,x}, h_f\right)$$

where:

$h_f$ is the altitude at the end of the geometric portion in question;

$CAS_p$ is the speed of the next foreseeable change in the configuration of the aircraft or the flight phase (S/F, L/G, A/I, DECEL, etc.); this speed is predefined and known from an aircraft performance database;

$CAS_i$ is the speed of the aircraft at the altitude hi;

$\Delta H_{MAX}$ is a maximum altitude discretisation value characterising the precision of the calculations; by default, this value is equal, e.g., to 2000 ft;

$h_{CSTRx}$ is the altitude at the speed constraint $CAS_{CSTR+}$ or $CAS_{CSTR-[i,CSTR+[}$, defined below, $$\frac{dCAS}{dh}_{TGT}$$

is the variation in the target speed in kts/ft depending on the flight phase, and defined such that in descent:

$$\frac{dCAS}{dh}\bigg|_{TGT} = \max\left(S, \min\left(\frac{CAS_{CSTR+} - CAS_i}{h_{CSTR+} - h_i}, \frac{CAS_{CSTR-[i,CSTR+[} - CAS_i}{h_{CSTR-[i,CSTR+[} - h_i}\right)\right),$$

and in approach:

$$\frac{dCAS}{dh}\bigg|_{TGT} = \min\left(\max\left(S, \frac{CAS_{CSTR+} - CAS_i}{h_{CSTR+} - h_i}\right), \frac{CAS_{CSTR-[i,CSTR+[} - CAS_i}{h_{CSTR-[i,CSTR+[} - h_i}\right),$$

where $CAS_{CSTR+}$ is the next speed constraint (in reverse) with a low limit (AT OR ABOVE, AT, or WINDOW), if any. It is the nearest constraint $CAS_{CSTR+}$ from the integration starting point over the entire geometric portion between $h_i$ and $h_f$;

$CAS_{CSTR-[i,CSTR+[}$ is the next speed constraint (in reverse) having a high limit (AT OR BELOW, AT, or WINDOW), if any, limiting the reverse acceleration from $CAS_i$ to $CAS_{CSTR+}$, based on a geometric interpolation;

$h_{CSTRx}$ is the altitude at the speed constraint in question, obtained by interpolating the calculation of the geometric slope between $h_i$ and $h_f$, taking into account a direct distance on the corresponding manual termination leg;

S is the minimum target acceleration rate that can be configured, and is equal, e.g. to 0 in descent and to $$\frac{25}{1000}$$

kts/ft in approach.

In each elementary interval i, the corresponding elementary slope FPAi is obtained using a known-art service that allows for the calculation of a slope according to certain criteria. In particular, this service, which relies on aircraft performance data, is a function of the following parameters:

$$FPA_i = f\left(\Delta ISA, m, h, S/F, T, W_x, W_y, CAS, \frac{dCAS}{dh}\bigg|_{TGT}, n_{EI}, \varepsilon, \Delta, x_{CG}, A/B, A/I, L/G, c, FPA_0\right),$$

where:

ΔISA is the temperature difference from the international standard atmosphere (ISA);

m is the mass of the aircraft;

h is the altitude of the aircraft;

S/F is the aerodynamic configuration of the aircraft ('slats/flaps');

T is the engine thrust of the aircraft;

$W_x$ is the headwind;

$W_y$ is the crosswind;

CAS is the calibrated air speed of the aircraft;

$\frac{dCAS}{dh}\bigg|_{TGT}$ is the variation in target CAS as a function of altitude in kts/ft;

$n_{EI}$ is the number of failed engines;

ε is the margin applied to the constant thrust;

Δ is the margin applied to the thrust in descent;

$x_{CG}$ is the position of the centre of gravity of the aircraft;

A/B is a parameter defining the position of the air brakes;

A/I is a parameter defining the status of the anti-ice system;

L/G is a parameter defining the position of the landing gear; retracted or extended;

c is the curve equal to the reciprocal of the turning radius;

$FPA_0$ is ground slope at the start of the calculation.

Figure 9:
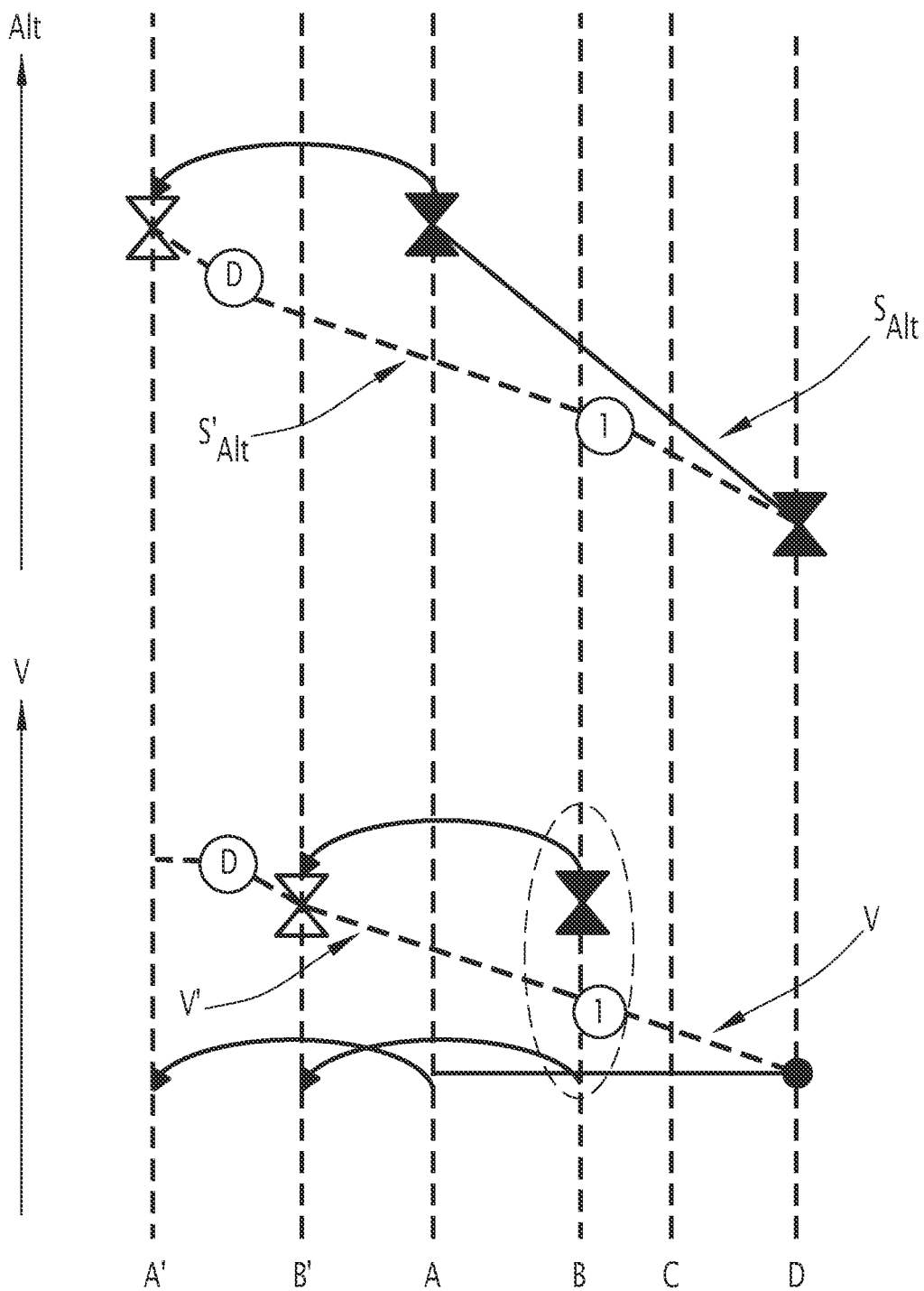

FIG. 9 shows the execution of the sub-step 113 in the example of FIG. 8.

In particular, FIG. 9 shows the new altitude $S_{Alt}'$ and speed V' profiles obtained by extending the lateral discontinuity BC following the calculation of the required distance $d_{req}$. The new distance BC, which is represented in FIG. 9 by the distance B'C, then corresponds to the required distance $d_{req}$ calculated. The new geometric portion AD is thus also extended, and corresponds to the portion A'D in the example in FIG. 9.

FIG. 9 also shows that the altitude profile $S_{Alt}'$ has a multitude of elementary slopes. However, it is possible to retain only one slope for the entire geometric portion in question.

Thus, in a first variant of the first embodiment, the retained slope has an equivalent resultant slope, i.e. a single slope equivalent to the overall variation in altitude and distance caused by all of the elementary slopes $FPA_i$.

In a second variant of the first embodiment, the retained slope has the most disadvantageous slope, i.e. a slope having the lowest absolute value of the plurality of elementary slopes $FPA_i$.

In this case, in order to avoid the local creation of an over-steep slope, the required distance dreg is calculated according to the following expression in lieu of the foregoing expression (1):

$$d_{req} = d_{dir} + \max\left(0, \frac{\Sigma_i \Delta H_i}{\tan(\max FPA_i)} - x\right).$$

In this second variant of the first embodiment, when the required distance $d_{req}$ is calculated, the processing unit 22 again goes to the sub-step 111 in order to ensure that no constraint on the geometric portion in question was missed.

In a second embodiment of the invention, the required distance $d_{req}$ is determined using the routine described below, based on the principle of dichotomy. This routine comprises the steps (i)-(viii) described infra.

In the step (i), the processing unit 22 initialises the slope $\gamma_1$ at a configurable initial value and the counter j j at 1. The initial value of the slope $\gamma_1$ is, e.g., equal to −3°.

In the following step (ii), the processing unit 22 calculates the reference profile along this slope $\gamma_1$ over the geometric portion in question according to the usual rules, incorporating the performance of the aircraft, meteorological conditions, etc.

In the following step (iii), the processing unit 22 analyses whether the profile constructed using the slope $\gamma_j$ complies with all of the intermediate altitude constraints on the geometric portion in question.

If this is the case, the processing unit 22 will move on to the next step (iv). Otherwise, i.e. if there is at least one missed constraint, the processing unit 22 will again go to the step 111, considering the missed constraint to be the intermediate endpoint.

In the step (iv), the processing unit 22 increments the counter j to obtain a new value of j=j+1.

In the next step (v), the processing unit 22 determines whether the reference profile calculated with the slope $\gamma_{j-1}$ meets all of the following criteria:
a. All speed constraints are complied with.
b.

$$\frac{dCAS}{dh} \geq S$$

for all acceleration segments;
c.

$$\frac{dCAS}{dh} \geq S$$

for all constant speed segments;
where CAS is the calibrated air speed of the aircraft and S is the configurable minimum rate of acceleration, equal, e.g., to $$\frac{25 \text{ kts}}{1000 \text{ ft}}$$

for variable-speed segments and to $$\frac{0 \text{ kts}}{1000 \text{ ft}}$$

for constant speed segments.

If the conditions (a)-(c) are met, the processing unit 22 determines the following value $\gamma_j$ of the slope as follows:

$$\gamma_j = \max\left(\gamma_{j-1} + \frac{\gamma_1}{2^{j-1}}, \gamma_{dir}\right),$$

$\gamma_{dir}$ is the slope of the reference profile calculated based on the direct distance between the frame segments.

In the step (vi), the processing unit 22 verifies a stopping condition of the routine, e.g. by comparing the value j with a predetermined threshold.

For example, this threshold is equal to 3.

Thus, if the value j is less than this threshold, the processing unit goes on to the step (ii). Otherwise, the processing unit 22 will move on to the next step (iv).

In this step (vii), the processing unit 22 chooses a retained slope $\gamma_{req}$ from the calculated slopes $\gamma_j$ as a whole. In particular, the retained slope $\gamma_{req}$ is the slope having the greatest absolute value that allows for compliance with all of criteria (a)-(c), or, if none exists, the slope having the lowest absolute value.

Then, the processing unit 22 determines the required distance dreq as follows:

$$d_{req} = \frac{\Delta H}{\tan \gamma_{req}},$$

where $\Delta H$ is the variation in altitude over the geometric portion in question.

In the two aforementioned embodiments, two specific cases must be distinguished.

The first specific cases is that in which the variation in altitude ($\Delta H$ or $\Delta H_i$) over the geometric portion in question is nil, but the speed is constrained by a low limit. In this case, the retained slope for this portion is also nil, and the trajectory is calculated based on acceleration step-down.

The second specific case, in which there is no altitude constraint requiring a particular slope, but there is a speed constraint with a low limit upstream of the initial point of the constant-thrust portion in question ('idle'). In this case, the reference profile is calculated in energy sharing mode, i.e. using a constant minimum thrust of the aircraft with a kinetic energy dissipation rate for fixed potential energy.

In these two specific cases, the required distance $d_{req}$ is determined according to the following expression:

$$d_{req} = d_{dir} + \max\left(0, \left(\sum_{CAS_0}^{CAS_{CSTR+}} \left(\frac{CAS_{i+1} - CAS_i}{\frac{dCAS}{dx}\bigg|_i}\right) - y\right) - x\right)$$

x is the total distance of the portion in question (taking into account a direct distance over the segment of discontinuity), which is reduced to the distance between the start of the segment of discontinuity (e.g. the start of the manual termination leg) (in reverse) and the end of the portion in question; this value then corresponds to the distance AC in the example of FIG. 8;

y is the distance covered at constant speed, if any, due to an upstream speed constraint $CAS_{CSTR-}$ (in reverse) of the segment of discontinuity, such that:

$$y = \max\left(0, \sum_{CAS_0}^{CAS_{CSTR+}} \left(\frac{CAS_{i+1} - CAS_i}{\frac{dCAS}{dx}\bigg|_i}\right) - \frac{CAS_{CSTR-} - CAS_0}{\frac{dCAS}{dx}\bigg|_0} - (x_{CSTR+} - x_{CSTR-})\right);$$

$CAS_{CSTR+}$ is a speed constraint requiring a deceleration rate (in reverse) going beyond the discontinuity of the corresponding discontinuity segment;

$d_{dir}$ is the direct distance between the corresponding frame segments;

$CAS_0$ is the speed at the start (in reverse) of the discontinuity segment;

$CAS_+$ is the lower limit of the speed constraint;

$CAS_{i+1}$ is the speed at the lower limit limited to the next foreseeable change in the configuration of the aircraft or the flight phase (S/F, L/G, A/I, DECEL, etc.) affecting performance;

$CAS_i$ is the speed of the aircraft at point i;

$$\frac{dCAS}{dx}\bigg|_i$$

refers to incremental variations in speed for the first specific case or in 'energy sharing mode' for the second specific case in kts/NM over the corresponding discretised portion; these variations are estimated using the performance model allowing for calculation of the deceleration capacity given the state of the aircraft and the meteorological data.

In the final sub-step 114, the processing unit 22 integrates the required distance dreq determined in the geometric portion in question of the reference profile, and designates the intermediate endpoint as the new integration starting point.

If this new integration starting point corresponds to the starting point of the aircraft or its current position, the construction of the reference profile is complete, and the processing unit 22 goes on to the following step 120. Otherwise, the processing unit 22 moves on to the step 111 with this new integration starting point.

In the step 120, the processing unit 22 determines vertical predictions related to a vertical trajectory of the aircraft based on the reference profile.

In particular, these predictions concern the speed of the aircraft, the flight time, the position, and the amount of fuel remaining, and are determined according to known-art methods.

In the following step 130, the processing unit 22 determines a lateral trajectory based on the vertical predictions.

In particular, this step comprises, for the or each segment of discontinuity, determining a substitution segment, with the spatial extent of the substitution segment being determined as a function of the required distance determined previously.

To this end, the processing unit 22 first determines a deselection point of the or each segment of discontinuity as a function of the required distance dreq corresponding to this segment and of the direct distance $d_{dir}$ between the framework segments corresponding to the segment of discontinuity.

Each deselection point is defined by a predicted distance $d_1$, which must be flown over the segment of discontinuity with the course procedurally encoded in the case of the manual termination leg or, otherwise, with the course of the leg preceding the lateral discontinuity in the flight plan.

In a first exemplary embodiment of this step 130, the predicted distance $d_1$ is determined according to the following expression:

$$d_1 = \frac{d_{req}^2 - d_{dir}^2}{2 \cdot (d_{req} - d_{dir} \cdot \cos(\theta))}$$

where θ is the angle formed between the two corresponding frame segments.

In this case, the spatial extent of the substitution segment, not taking into account the size of the transitions at its ends, is equal to the required distance dreq.

If the aircraft is required to follow a course other than the one initially planned, the predicted distance d1 is determined according to the following expression:

$$d_1 = \frac{d_{req}^2 - d_{dir}^2}{2 \cdot (d_{req} - d_{dir} \cdot \cos(\theta'))}$$

where θ' is the angle formed between the new course and the frame segment following the segment of discontinuity.

Then, the processing unit 22 determines the transition at the deselection point of the corresponding discontinuity segment and the point of arrival at the frame segment following this discontinuity segment.

These transitions are determined depending on the type of transition desired (fly-by or overfly) and the type of alignment required by the frame segment following the corresponding discontinuity segment.

These transitions are determined, e.g., using the methods set forth in FR 3 064 351 A1.

In a second exemplary embodiment, the predicted distance d1 is determined such that the total length of the trajectory, including the transitions, is equal to the required distance $d_{req}$.

In this case, the predicted distance $d_1$ is determined according to formulae analogous to those set forth supra, but taking into account the known values of the turning radius and the change of course determined by the corresponding transitions.

In the following step 140, the processing unit 22 transmits the trajectory determined to the output unit 23, which transmits it to on-board systems using the trajectory.

In particular, in this step 140, the processing unit 22 transmits the trajectory determined to a display in the cockpit of the aircraft, in particular to the vertical display and/or the navigation display.

In one exemplary embodiment of the invention, such a screen shows the lateral trajectory of the aircraft with lateral discontinuities caused by the lateral discontinuities in the flight plan.

Advantageously, in this case, the screen showing the lateral trajectory (navigation display) also shows a symbol representing the deselection point for the or each segment of discontinuity.

Figure 10:
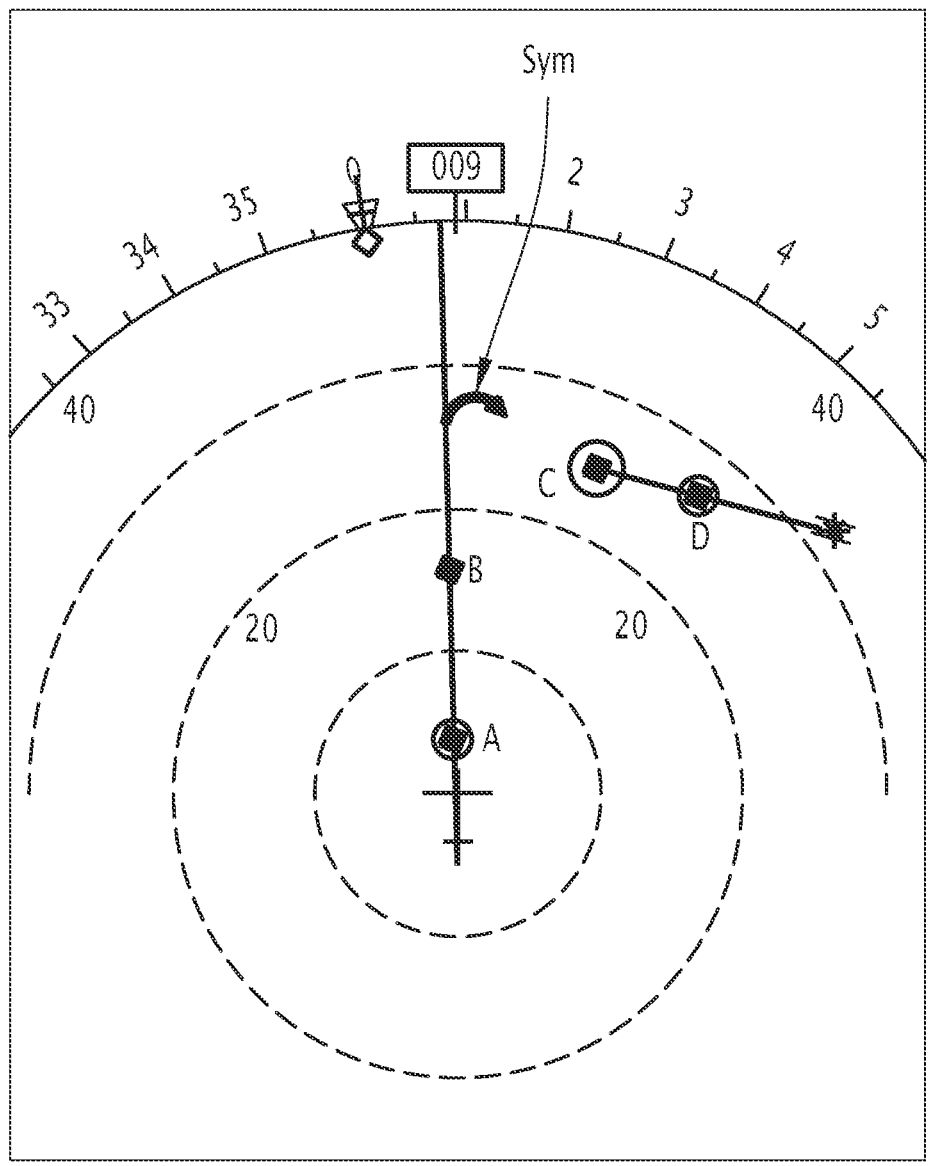

An example of such a display is shown in FIG. 10.

Indeed, as shown in FIG. 10, a lateral discontinuity of the lateral trajectory of the aircraft is defined between the points B and C, and the symbol Sym indicates the deselection point of the corresponding manual termination leg.

In one variant, the lateral trajectory and/or the vertical trajectory is/are continuously shown on the corresponding display. In this case, the segment of the trajectory corresponding to each lateral discontinuity is shown specifically, thus allowing it to be distinguished from the other segments of the trajectory. Thus, for example, such a segment is shown by a dashed line.

Figure 11:
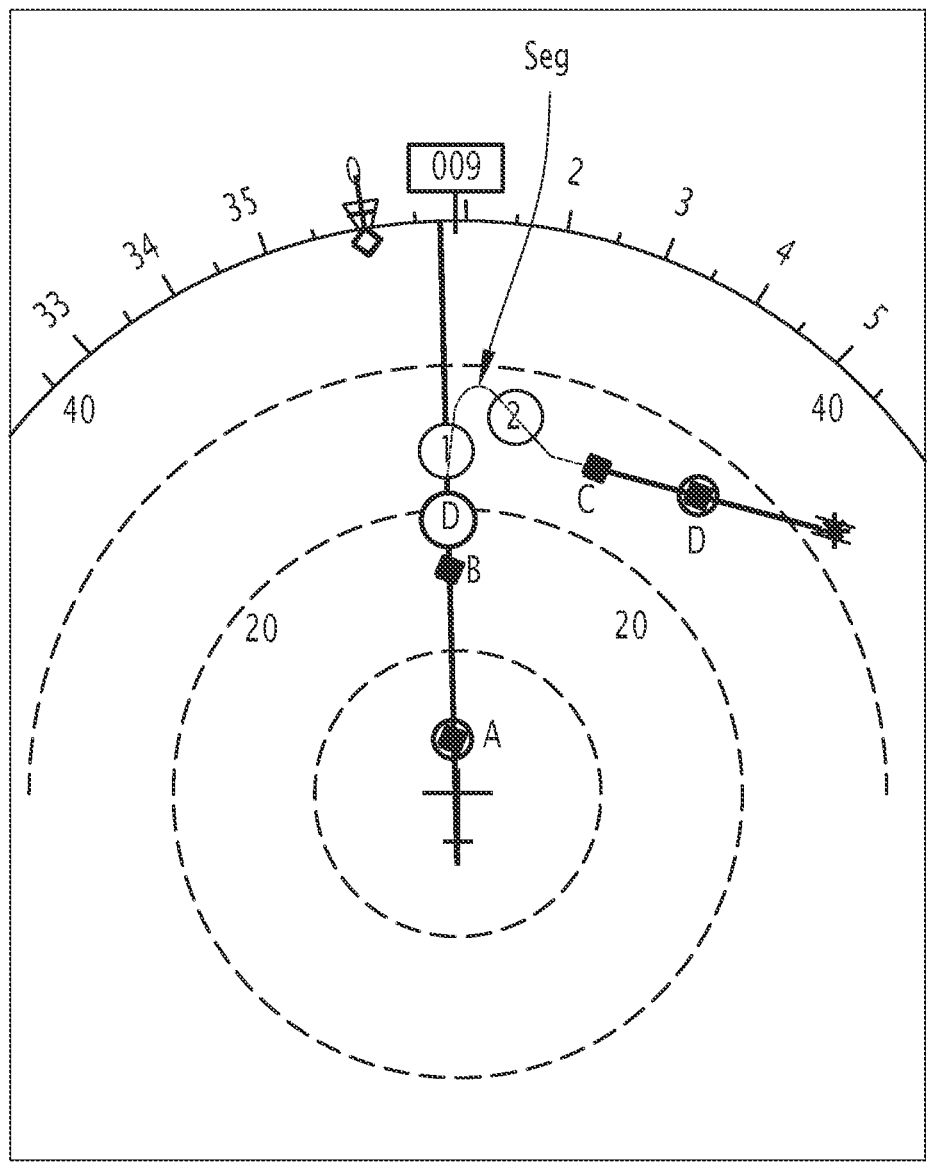

In the example of FIG. 11, the lateral segment BC constructed in the step 130 is shown by a dashed line.

In this case, it can be seen that this invention has a certain number of advantages.

Indeed, the invention allows the trajectory of an aircraft to be constructed taking into account the lateral discontinuities formed, e.g. by manual termination legs.

This trajectory allows for better energy management on the aircraft, in particular during descent, and for more reliable predictions. This, in turn, allows for segments that are too steep and excessive speeds to be avoided whilst the aircraft is in flight. This also allows for unfounded alerts to be avoided during flight and/or flight planning.

The invention claimed is:

1. A method for determining a trajectory of an aircraft and displaying the determined trajectory on a vertical display or navigation display of a flight managements system in a cockpit, wherein the method is implemented by an electronic module connected to the flight management system of the aircraft, comprising steps:
- determining a reference profile along a lateral trajectory precalculated based on a plurality of speed or altitude constraints, the precalculated lateral trajectory comprising a plurality of segments, the determining step comprising:
- searching in the precalculated lateral trajectory for at least one segment of discontinuity between two segments, called frame segments, the at least one segment of discontinuity comprising a lateral discontinuity;
- for the at least one segment of discontinuity, determining a required distance corresponding to a minimum flight distance between the two frame segments, allowing for compliance with the speed or altitude constraints while flying along the frame segments; and
- integrating the required distance into the reference profile;
- determining, based on the reference profile, vertical predictions related to a vertical trajectory of the aircraft;
- determining, based on the vertical predictions, a resulting lateral trajectory comprising for the at least one segment of discontinuity, determining a substitution segment connecting the two frame segments in a continuous manner, a length of the substitution segment being determined as a function of the required distance determined for the at least one segment of discontinuity;
- wherein the substitution segment for the at least one segment of discontinuity is displayed on the vertical display or navigation display representing the resultant lateral trajectory of the aircraft;
- displaying a graphical symbol on the vertical display or navigation display representing a deselection point for the at least one segment of discontinuity;
- wherein the determining the reference profile comprises sub-steps, which are carried out in reverse from an integration starting point and include:
  - determining an intermediate endpoint and determining a geometric portion of the reference profile delimited by the integration starting point and the intermediate endpoint;
  - searching on the geometric portion, for the at least one segment of discontinuity between two segments, the two segments including the frame segments; and
  - when the at least one segment of discontinuity exists:
    - determining the required distance for the at least one segment of discontinuity; and
    - integrating the required distance into the portion of the reference profile.

2. The method according to claim 1, wherein the required distance is greater than or equal to a direct distance is greater than or equal to a direct distance connecting the frame segments.

3. The method according to claim 1, wherein the required distance is determined as a function of a direct distance between the frame segments of the at least one segment of discontinuity.

4. The method according to claim 3, wherein the required distance is further determined as a function of a plurality of elementary slopes, each elementary slope being calculated for an elementary interval that is part of the geometric portion on which the at least one of the segment of discontinuity corresponding to the required distance has been identified, as a function of a performance of the aircraft on the elementary interval.

5. The method according to claim 3, wherein the required distance is further determined as a function of a slop retained for the geometric portion on which the segment of discontinuity corresponding to the required distance has been identified, the retained slope corresponding to one of elements selected from the group including:
- a resulting equivalent slope determined using a value of the distance required and an altitude variation over said geometric portion; and
- a slope having a smallest absolute value among a plurality of elementary slopes, each elementary slope being calculated for an elementary interval that is part of the geometric portion as a function of performance of the aircraft over the elementary interval.

6. The method according to claim 1, wherein the required distance is determined as a function of an altitude variation over the geometric portion on which the segment of discontinuity corresponding to the required distance has been identified and of a retained slope, said retained slope being selected from a plurality of elementary slopes, each following elementary slope being obtained by means of an iterative dichotomy technique using an initial elementary slope and a preceding elementary slope.

7. The method according to claim 1, wherein the at least one segment of discontinuity corresponds to a manual termination leg.

8. The method according to claim 7, wherein the determination of the substitution segment for the at least one segment of discontinuity in the step of determining the resulting lateral trajectory comprises determining a deselection point of the corresponding manual termination leg as a function of the required distance determined for the at least one discontinuity segment and of a direct distance between the corresponding frame segment.

9. The method according to claim 8, wherein a graphical symbol representing the deselection point for each manual termination leg is displayed on a screen representing the resultant lateral trajectory of the aircraft.

10. The method according to claim 1, wherein the substitution segment for the at least one segment of discontinuity is displayed on a screen representing the resultant lateral trajectory of the aircraft.

11. A non-transitory computer program product including software instructions that, when executed by computer equipment, execute the method according to claim 1.

12. An assembly comprising a flight management system and a module for determining the trajectory of the aircraft, comprising technical means configured to carry out the method according to claim 1.

* * * * *